(12) United States Patent
Sun et al.

(10) Patent No.: US 11,755,098 B2
(45) Date of Patent: Sep. 12, 2023

(54) INTELLIGENT TERMINAL ENERGY SAVING METHOD AND DEVICE BASED ON AI PREDICTION

(71) Applicant: Samsung Electronics Co., Ltd., Suwon-si (KR)

(72) Inventors: Hai Sun, Nanjing (CN); Wei Su, Nanjing (CN); Yi Jiang, Nanjing (CN); Zhigang Dong, Nanjing (CN); Hua Liu, Nanjing (CN); Chunhai Liu, Nanjing (CN); Xiaokai Tang, Nanjing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 117 days.

(21) Appl. No.: 17/418,596

(22) PCT Filed: Dec. 27, 2019

(86) PCT No.: PCT/KR2019/018666
§ 371 (c)(1),
(2) Date: Jun. 25, 2021

(87) PCT Pub. No.: WO2020/139048
PCT Pub. Date: Jul. 2, 2020

(65) Prior Publication Data
US 2022/0066529 A1    Mar. 3, 2022

(30) Foreign Application Priority Data
Dec. 28, 2018    (CN) .......................... 201811619992.0

(51) Int. Cl.
*G06F 1/329*    (2019.01)
*G06F 11/30*    (2006.01)
(Continued)

(52) U.S. Cl.
CPC ............ *G06F 1/329* (2013.01); *G06F 9/4893* (2013.01); *G06F 11/302* (2013.01); *G06F 11/3495* (2013.01)

(58) Field of Classification Search
CPC ...... G06F 1/329; G06F 9/4893; G06F 11/302; G06F 11/3495; G06F 8/65;
(Continued)

(56) References Cited

U.S. PATENT DOCUMENTS

2014/0366041 A1    12/2014    Stanley-Marbell et al.
2015/0160976 A1    6/2015    Kim et al.
(Continued)

FOREIGN PATENT DOCUMENTS

CN    103810105 A    5/2014
CN    103347136 B    6/2015
(Continued)

OTHER PUBLICATIONS

The Light of Android, the Battle of the Turning Point? Mi 11 Ultra, Pro Quick Scan Reviews (https://www.youtube.com/channel/UC6ISXkvMtP_Je1ITiYIJSSA).

*Primary Examiner* — Michael J Brown
(74) *Attorney, Agent, or Firm* — Jefferson IP Law, LLP

(57) ABSTRACT

The disclosure discloses an intelligent terminal energy saving method based on artificial intelligence (AI) prediction. The method includes: collecting application (APP)-related operation data on the intelligent terminal; carrying out AI analysis on the APP-related operation data collected, to predict timing and a restriction measurement to restrict an APP in a background; and adopting the restriction measurement to restrict the APP in the background at the timing predicted. Corresponding to the method, the disclosure further discloses an intelligent terminal energy saving device based on AI prediction. Using the technical schemes dis-
(Continued)

closed in the disclosure, the power consumption of applications on a portable intelligent terminal can be reduced, and the battery life can be extended, without affecting the user experience.

16 Claims, 4 Drawing Sheets

(51) Int. Cl.
*G06F 9/48* (2006.01)
*G06F 11/34* (2006.01)
*G06F 8/65* (2018.01)
*G06F 9/445* (2018.01)

(58) Field of Classification Search
CPC .......... G06F 2209/5019; G06F 9/5094; G06F 1/3234; G06F 1/324; G06F 1/3287; G06F 9/445; G06F 1/3243; Y02D 10/00
USPC .................................................. 713/300, 320
See application file for complete search history.

(56) References Cited

U.S. PATENT DOCUMENTS

| | | |
|---|---|---|
| 2015/0261548 A1 | 9/2015 | Moon et al. |
| 2016/0062792 A1 | 3/2016 | Yuan et al. |
| 2016/0073351 A1* | 3/2016 | Cardozo .......... H04W 52/0258 455/574 |
| 2017/0339639 A1 | 11/2017 | Stojanovski et al. |
| 2018/0032368 A1 | 2/2018 | Choi et al. |
| 2018/0368073 A1* | 12/2018 | Bai .................. H04W 52/0258 |

FOREIGN PATENT DOCUMENTS

| | | |
|---|---|---|
| CN | 106200867 A | 12/2016 |
| CN | 106292999 A | 1/2017 |
| CN | 106326069 A | 1/2017 |
| CN | 106572526 A | 4/2017 |
| CN | 107102716 A | 8/2017 |
| CN | 107526424 A | 12/2017 |
| KR | 10-2018-0013608 A | 2/2018 |

* cited by examiner

[Fig. 1]
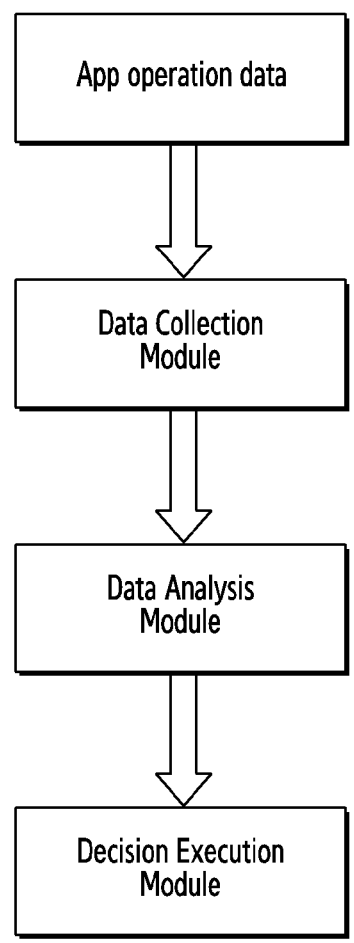

[Fig. 2]
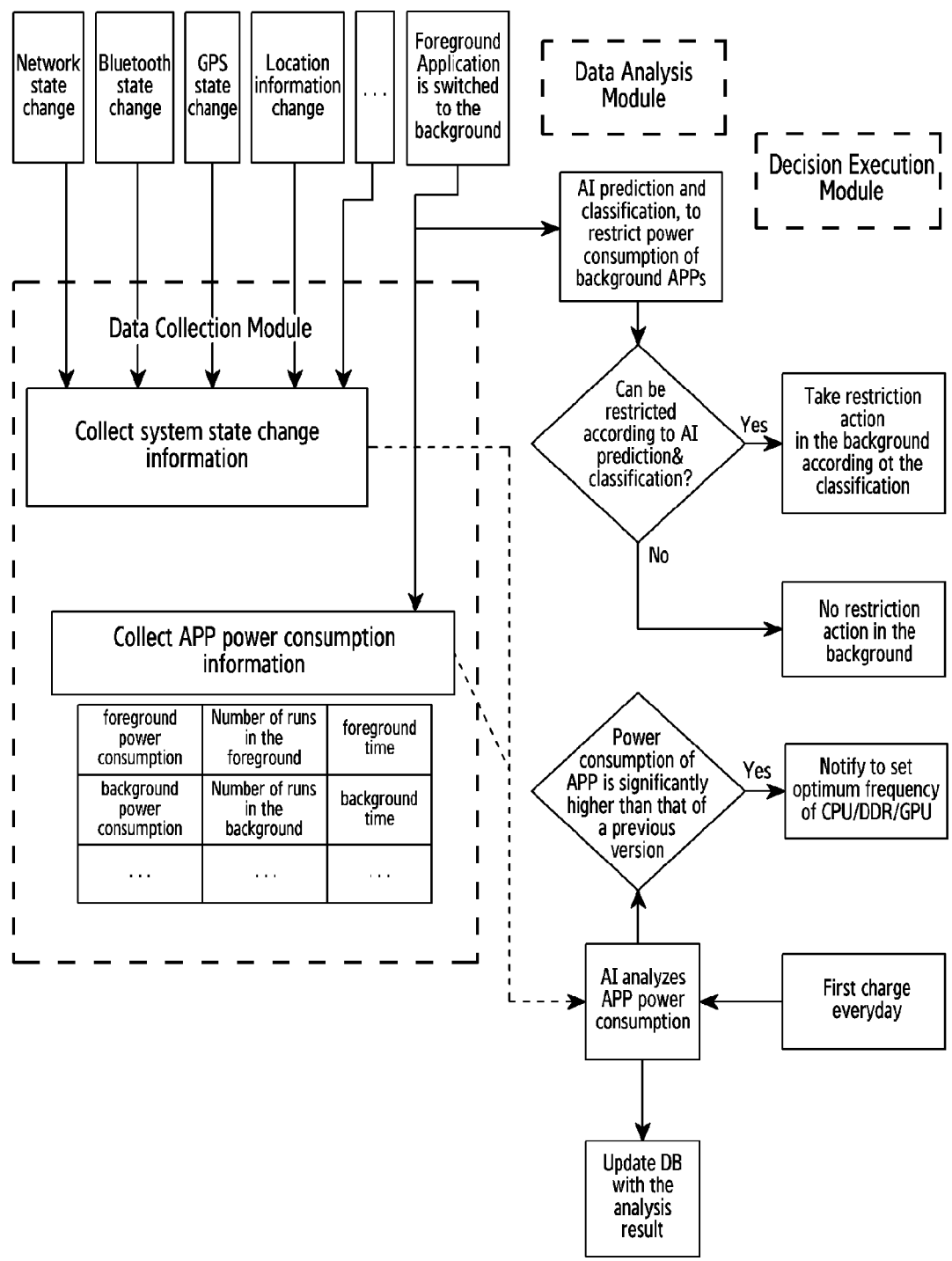

[Fig. 3]
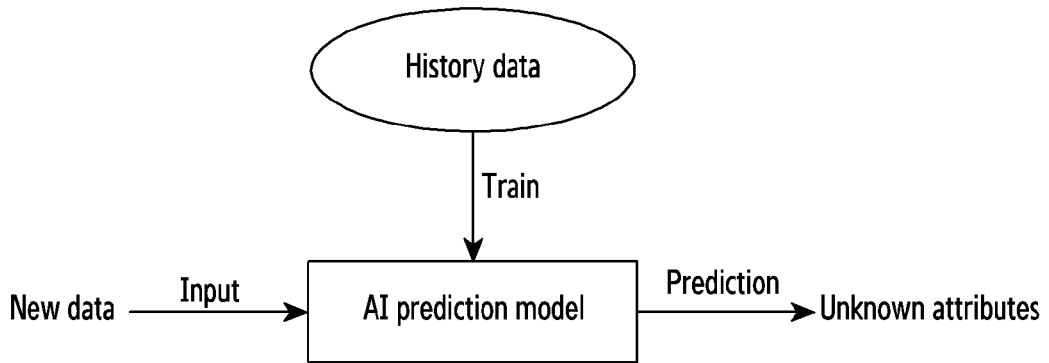
[Fig. 4]
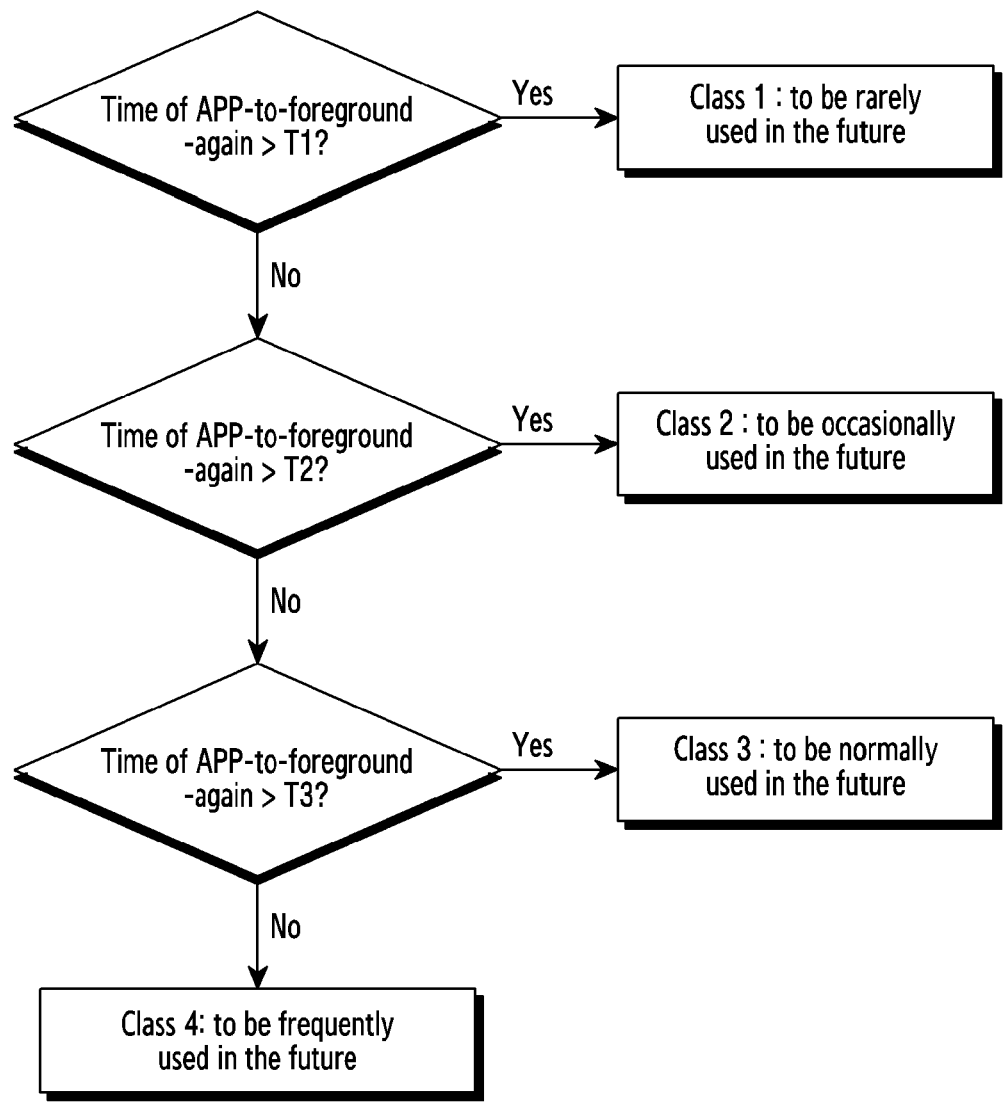

[Fig. 5]
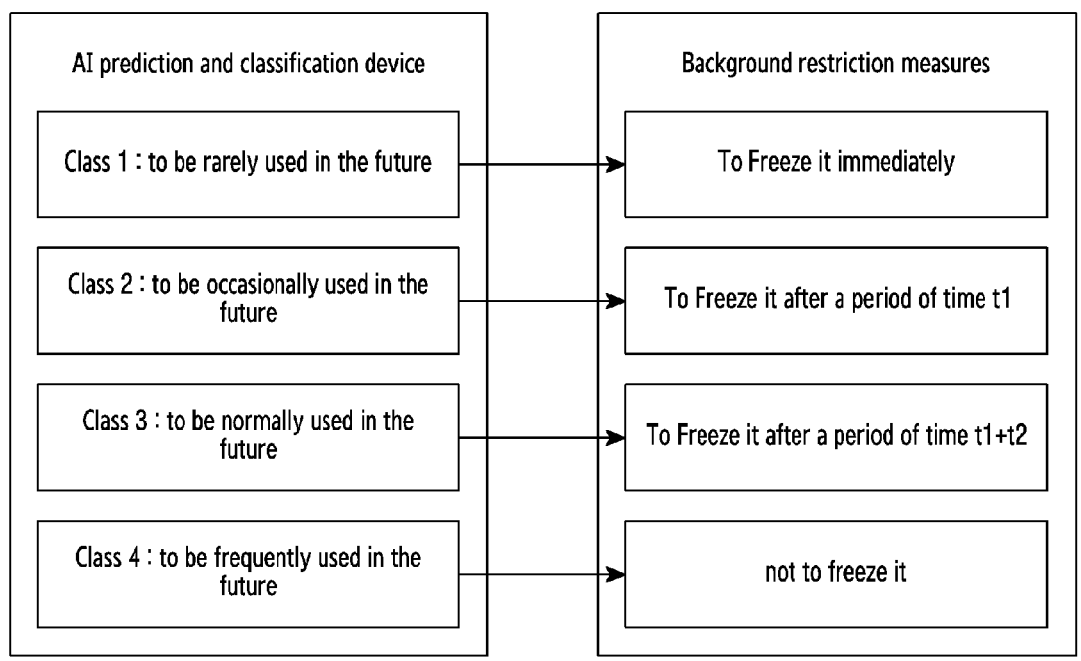

INTELLIGENT TERMINAL ENERGY SAVING METHOD AND DEVICE BASED ON AI PREDICTION

CROSS-REFERENCE TO RELATED APPLICATION(S)

This application is a U.S. National Stage application under 35 U.S.C. § 371 of an International application number PCT/KR2019/018666, filed on Dec. 27, 2019, which is based on and claims priority of a Chinese patent application number 201811619992.0, filed on Dec. 28, 2018, in the Chinese Intellectual Property Office, the disclosure of which is incorporated by reference herein in its entirety.

TECHNICAL FIELD

The present disclosure relates to the technical field of artificial intelligence, and in particular to an intelligent terminal energy saving method and device based on AI prediction.

BACKGROUND ART

With intelligent terminals such as intelligent phones and tablet computers being used increasingly frequently, the power consumption issue becomes increasingly outstanding. Thus, reducing the power consumption of a terminal and extending the battery life are meaningful for improving the user experience.

At present, on an intelligent terminal, there are a great number of applications (Apps), and the qualities of the applications vary differently. Usually, a large part of power of the intelligent terminal is consumed by the applications. The power consumed by the applications consists of two parts, foreground and background, in which the foreground is responsible for intermeasurement with the user, and the background is responsible for running various services, and so on. Some applications have frequent activities in the background, which in most cases is unnecessary, but wastes a great amount of power, and shortens the battery life. Meanwhile, some applications are frequently updated, and a part of versions of the applications show significantly high power consumption when these versions of applications are used in the foreground.

Therefore, it is meaningful to save power and reduce the power consumption on the intelligent terminal without affecting the user experience.

DISCLOSURE OF INVENTION

Technical Problem

An aspect of the present disclosure provides an intelligent terminal energy saving method and device based on AI prediction, to reduce the power consumption of applications on a portable intelligent terminal, and extend the battery life, without affecting the user experience.

Solution to Problem

The present disclosure discloses an intelligent terminal energy saving method based on artificial intelligence (AI) prediction, including:

collecting application (APP)-related operation data on the intelligent terminal;

carrying out AI analysis on the APP-related operation data collected, to predict timing and a restriction measurement to restrict an APP in a background; and adopting the restriction measurement to restrict an APP in the background at the timing predicted.

Preferably, the method further includes:

determining and recording an optimum frequency of a CPU/DDR/GPU when the APP is operating in a foreground; and setting a frequency of the CPU/DDR/GPU to the optimum frequency recorded, or prompting a user to upgrade the APP, when power consumption of the APP in the foreground is abnormal.

Preferably, predicting the timing and the restriction measurement to restrict the APP in the background includes:

predicting and classifying a frequency of using the APP in future according to a user habit of using the APP and a current scenario, and adopting a corresponding restriction measurement to restrict power consumption of the APP in the background according to a classification result.

Preferably, predicting and classifying the frequency of using the application in the future includes:

predicting a time T when a user uses the APP in the foreground again next time according to the user habit of using the APP and the current scenario;

if $T>T1$, classifying the APP to Class 1 which indicates to be rarely used in the future; or otherwise, if $T>T2$, classifying the APP to Class 2 which indicates to be occasionally used in the future; or otherwise, if $T>T3$, classifying the APP to Class 3 which indicates to be normally used in the future; or otherwise, classifying the APP to Class 4 which indicates to be frequently used in the future;

where T1, T2, and T3 are preset time criteria, and $T1>T2>T3>0$.

Preferably, adopting the corresponding restriction measurement to restrict the power consumption of the APP in the background according to the classification result includes:

for an APP of Class 1, determining a corresponding restriction measurement in the background to be to immediately freeze the APP of Class 1;

for an APP of Class 2, determining a corresponding restriction measurement in the background to be to freeze the APP of Class 2 after a period of time t1;

for an APP of Class 3, determining a corresponding restriction measurement in the background to be to freeze the APP of Class 2 after a period of time t1+t2; and for an APP of Class 4, determining a corresponding restriction measurement in the background to be not to freeze the APP of Class 4;

where t1 and t2 are preset times.

Preferably, the APP-related operation data includes: system state change information and APP power consumption information during a runtime of the APP, in which the system state change information includes, but not limited to: network state change information, Bluetooth state change information, GPS state change information, location change information, and CPU/DDR/GPU frequency information; and the APP power consumption information includes, but not limited to: foreground power consumption, background power consumption, a number of runs in the foreground, a number of runs in the background, a foreground run time, and a background run time.

The present disclosure further discloses an intelligent terminal energy saving device based on artificial intelligence (AI) prediction, including: a data collection module, a data analysis module, and a decision execution module, in which the data collection module is configured to collect application (APP)-related operation data on the intelligent terminal;

the data analysis module is configured to carry out AI analysis on the APP-related operation data collected by the data collection module, to predict timing and a restriction measurement to restrict an APP in a background, and send a corresponding command to the decision execution module; and the decision execution module is configured to receive the command sent from the data analysis module, and adopt the restriction measurement to restrict the APP in the background at the timing predicted.

Preferably, the data analysis module is further configured to:

determine and record an optimum frequency of a CPU/DDR/GPU when the APP is operating in a foreground; and notify the decision execution module to set a frequency of the CPU/DDR/GPU to the optimum frequency recorded, or prompt a user to upgrade the APP, when power consumption of the APP in the foreground is abnormal.

Preferably, the data analysis module is further configured to:

predict and classify a frequency of using the APP in future according to a user habit of using the APP and a current scenario, and adopt a corresponding restriction measurement to restrict power consumption of the APP in the background according to a classification result.

Preferably, the data analysis module is further configured to:

predict a time T when a user uses the APP in the foreground again next time according to the user habit of using the APP and the current scenario;

if T>T1, classify the APP to Class 1 which indicates to be rarely used in the future; or otherwise, if T>T2, classify the APP to Class 2 which indicates to be occasionally used in the future; or otherwise, if T>T3, classify the APP to Class 3 which indicates to be normally used in the future; or otherwise, classify the APP to Class 4 which indicates to be frequently used in the future;

where T1, T2, and T3 are preset time criteria, and T1>T2>T3>0.

Preferably, the data analysis module is further configured to:

for an APP of Class 1, determine a corresponding restriction measurement in the background to be to immediately freeze the APP of Class 1;

for an APP of Class 2, determine a corresponding restriction measurement in the background to be to freeze the APP of Class 2 after a period of time t1;

for an APP of Class 3, determine a corresponding restriction measurement in the background to be to freeze the APP of Class 2 after a period of time t1+t2; and for an APP of Class 4, determine a corresponding restriction measurement in the background to be not to freeze the APP of Class 4;

where t1 and t2 are preset times.

Preferably, the APP-related operation data includes: system state change information and APP power consumption information during a runtime of the APP, in which the system state change information includes, but not limited to: a network state change, a Bluetooth state change, a GPS state change, a location information change, and a CPU/DDR/GPU frequency; and the APP power consumption information includes, but not limited to: foreground power consumption, background power consumption, a number of runs in the foreground, a number of runs in the background, a foreground run time, and a background run time.

Advantageous Effects of Invention

As can be seen from the above technical schemes, the present disclosure provides an intelligent device energy saving method and device based on AI prediction, learns characteristics of respective APPs running on the intelligent terminal through the AI technique, classifies the frequencies of using the respective APPs, and predicts the times when the respective APPs run in the foreground and background. For some APPs which are not frequently used or will not be used recently but run in the background, the method and the device directly restrict the APPs from running in the background; and for some APPs in the foreground, to which abnormal power consumption happens, the method and the device restrict the resources they use, so as to achieve the purpose of saving energy and reduce power consumption. The present disclosure can reduce the power consumption of the APPs in the foreground and background, and extend the battery life.

BRIEF DESCRIPTION OF DRAWINGS

FIG. 1 is a schematic diagram of a structure of an intelligent terminal energy saving device based on AI prediction according to the present disclosure;

FIG. 2 is a schematic diagram of a flow of an intelligent terminal energy saving method based on AI prediction according to the present disclosure;

FIG. 3 is a schematic diagram of a principle of AI prediction according to the present disclosure;

FIG. 4 is a schematic diagram of AI predicting and classifying a time of APP-to-foreground-again according to the present disclosure; and FIG. 5 is a schematic diagram of corresponding relationships between AI prediction classes and background restriction measurement.

BEST MODE FOR CARRYING OUT THE INVENTION

To make the object, technical schemes and advantages of the present disclosure more apparent, the present disclosure will be further described according to the following embodiments with reference to the drawings.

In a practical application scenario, some APPs run in a background of an intelligent terminal without being aware of it by the user, which wastes power. However, restricting the APPs in the background will not affect user experience. Based on this analysis, the present disclosure proposes to save energy and reduce power consumption, and improve the battery life, without affecting the user experience, through efficiently restricting unnecessary activities of APPs in the background, and reducing abnormal power consumption of APPs in the foreground.

At present, the AI technology is very popular. The present disclosure mainly uses the AI technology to achieve energy saving on an intelligent terminal. To be specific, the present disclosure provides an intelligent terminal energy saving method and device based on AI prediction, obtains an AI prediction model through the AI technology by recording and learning a user's habit of using the intelligent terminal, and determines whether restricting APPs running in the foreground and background on the intelligent terminal will affect the user experience based on a current scenario mode according to the AI prediction model, and in case of not affecting the user experience, adopts corresponding restriction measurement for the APPs running in the foreground and background, to achieve the purpose of reducing power consumption.

A structure of an intelligent terminal energy saving device based on AI prediction provided by the present disclosure is as shown in FIG. 1. The device includes a data collection module, a data analysis module, and a decision execution module. The functions and operations of the respective modules in the energy saving device for the intelligent terminal will be further illustrated in combination with a schematic diagram of a flow of an intelligent terminal energy saving method based on AI prediction shown in FIG. 2.

1. The data collection module is responsible for collecting APP-related operation data.

The data needing to collect includes: system state change information and APP power consumption information during a runtime of the APP, in which:

the system state change information includes, but not limited to: a network state change, a Bluetooth state change, a GPS state change, a location information change, and a CPU/DDR/GPU frequency; and the APP power consumption information includes, but not limited to: foreground power consumption, background power consumption, a number of runs in the foreground, a number of runs in the background, a foreground run time, and a background run time.

The collected data is sent to the data analysis module for the data analysis module to perform analysis using AI to determine the operating characteristics of the APP.

2. The data analysis module is responsible for performing AI analysis and prediction on the APP-related operation data collected by the data collection module.

As shown in FIG. 3, the principle of AI prediction is: constructing an AI prediction model by using history data regarding the user using the intelligent terminal collected by the data collection module to performing AI training and learning; and inputting new data collected by the data collection module into the AI prediction model to automatically predict future unknown attributes, after obtaining the AI prediction model.

For an APP running in the foreground, the AI prediction model determines whether the power consumption of an APP running in the foreground is normal by analyzing the system state change characteristics and behavior characteristics of the APP, determines an optimum frequency of a CPU/DDR/GPU when the APP runs in the foreground, and updates a database using the analysis result. When the power consumption of the APP is significantly higher than that of a previous version, the AI prediction model notifies the decision execution module to set the optimum frequency of the CPU/DDR/GPU.

For an APP running in the background, the AI prediction model predicts and classifying a frequency of using the background APP in the future according to a habit of using the APP and the characteristics of a current scenario, and restricts the power consumption of the background APP according to a classification result. To be specific, a way of predicting and classifying the frequency of using the background APP in the future is: predicting a time T (hereinafter, referred to as "time of APP-to-foreground-again") when the user uses the APP in the foreground again next time according to the habit of the using the APP and the characteristics of the current scenario; and predicting and classifying the frequency at which the APP is used in the future according to preset time criteria, as shown in FIG. 4:

If the time of APP-to-foreground-again T>T1, then the APP is classified into Class 1 which indicates to be rarely used in the future; or otherwise, if the time of APP-to-foreground-again T>T2, then the APP is classified into Class 2 which indicates to be occasionally used in the future; or otherwise, if the time of APP-to-foreground-again T>T3, the APP is classified into Class 3 which indicates to be normally used in the future; or otherwise, the APP is classified into Class 4 which indicates to be frequently used in the future;

where T1, T2, and T3 are preset time criteria, and T1>T2>T3>0.

Based on the classification of using frequencies, different restriction measurements may be adopted for different classes, and a time to start to restrict the APP without affecting the user experience when the current APP runs in the background is determined. Meanwhile, the power consumption of different versions of an APP may be compared to determine whether there a version has abnormal power consumption.

Corresponding to the above four AI prediction classes, the present disclosure adopts different background restriction measurements, and FIG. 5 shows a schematic diagram of corresponding relationships between AI prediction and classifications and background restriction measurements:

for Class 1, to be rarely used in the future, a corresponding background restriction measurement is to freeze it immediately;

for Class 2, to be occasionally used in the future, a corresponding background restriction measurement is to freeze it after a period of time t1;

for Class 3, to be normally used in the future, a corresponding background restriction measurement is to freeze it after a period of time t1+t2; and for Class 4, to be frequently used in the future, a corresponding restriction measurement is not to freeze it;

where t1 and t2 are preset times.

3. The decision execution module is responsible for executing the decision made according to the AI analysis result.

As shown in the description for the data analysis module, the AI prediction model analyzes background APPs according to the characteristics of a current operating scenario, to determine whether restricting an APP will affect the user experience, and if no, then the AI prediction model predicts when to send a restriction command to the decision execution module, and sends a restriction command to the decision execution module according to a prediction result; and after the decision execution module receives the restriction command, it restricts a corresponding APP. As the commands vary, the restriction measurements may include, but not limited to: killing, freezing, restricting CPUset (large and small cores), restricting CPU/DDR/GPU frequency, restricting memory usage, etc.

For an APP running in the background, a frequency of using the APP is classified according to the AI prediction model for selecting a scheme, the detailed procedure of it is shown in FIG. 5:

For an APP to be rarely used (e.g., Class 1), a freezing operation (i.e., a killing process) is executed;

For an APP to be frequently used (e.g., Class 4), it is not restricted;

For APPs not in the foregoing two cases (i.e., APPs used in an average frequency, e.g., Class 2 and Class 3), the freezing operation is performed.

Then, for a background APP, for which the freezing operation is performed, when a waiting time predicted by the AI is reached, the freezing operation is performed.

For an APP running in the foreground, if the data analysis module determine, through analysis, that the current version of the APP has an abnormal power consumption, then the data analysis module sends a command to the decision execution module, and the decision execution module prompts the user to upgrade the APP, and meanwhile, it reports this to a big data center, to notify the APP releaser to repair the APP; and when the APP runs in the foreground, sets the CPU/DDR/GPU frequency to the optimum frequency corresponding to the scenario.

After executing the resource restriction measurements for the foreground and background APPs, since the resources consumed by the APPs are limited, and therefore, the power consumption of the APPs running in the foreground and background can be efficiently reduced, and the battery life is extended, and thus the purpose of energy saving is achieved.

The schemes of the present disclosure will be further described with reference to three preferable embodiments:

Embodiment I

Assume that a user newly installs an application APP1 and uses APP1 occasionally in his daily life, and after the use, APP1 falls back to the background. However, APP1 is in fact still running for a long time, which wastes power.

The data collection module records operation characteristic data values of APP1, and sends the operation characteristic data values of APP1 to the data analysis module to perform analysis. After the analysis, the data analysis module finds that APP1 has high power consumption in the background, and the user is not using the APP, and the APP can be frozen immediately. Based on the analysis result, the data analysis module sends a restriction command to the decision execution module, so that the decision execution module immediately freezes APP1 which operates in the background, and thereby efficiently reducing power consumption, and embodying the advantage of energy saving of the present disclosure.

Embodiment II

Assume that after a user upgrades an operating system (OS) on his terminal, the user finds that the terminal generates more heat than before, and the consumption of the battery is sped up. The user does not know the reason, and may think the OS of the terminal is not good.

The data collection module of the present disclosure records average values of power consumption of APP2 in the background before and after the upgrade of the OS, and sends the average values of power consumption of APP2 to the data analysis module. After the data analysis module performs AI learning and analysis for the average values of power consumption of APP2, it finds that after the OS is upgraded, the average value of power consumption of APP2 in the background is significantly higher than that before the upgrade, and thus, it concludes that the version of software has abnormal power consumption when running on the new OS. The data analysis module sends a command to the decision execution module, and the decision execution module notifies the user to upgrade APP2. After the user upgrades APP2, the problem of abnormal heat is eliminated, and the power consumption of the battery becomes normal.

Embodiment III

After a user rests in the night, he will not notice the running of general applications such as PUSH, navigation, and shopping applications, and thus the running of the applications on his mobile phone can be restricted to save power, and meanwhile, when some peripheral devices such as the Bluetooth, GPS, and breathing light are turned off, the power is further saved.

The foregoing is only preferred embodiments of the present disclosure and is not intended to limit the present disclosure. Any modification, equivalent substitution, and improvement without departing from the spirit and principle of the present disclosure should be covered in the protection scope of the present disclosure.

The invention claimed is:

1. A method based on artificial intelligence (AI) prediction in a mobile communication system the method comprising:
    collecting application (APP)-related operation data on a terminal;
    carrying out AI analysis on the APP-related operation data, to predict a timing and a restriction measurement to restrict an APP in a background;
    determining and recording an optimum frequency of a central processing unit (CPU)/double data rate (DDR)/graphics processing unit (GPU) in case that the APP is operating in a foreground;
    adopting the restriction measurement to restrict the APP in the background at the timing predicted; and
    setting a frequency of the CPU/DDR/GPU to the optimum frequency, or prompting a user to upgrade the APP, in case that power consumption of the APP in the foreground is abnormal.

2. The method of claim 1, wherein the predicting the timing and the restriction measurement to restrict the APP in the background comprises:
    predicting and classifying a frequency of using the APP in future according to a user habit of using the APP and a current scenario, and
    adopting a corresponding restriction measurement to restrict power consumption of the APP in the background according to a classification result.

3. The method of claim 2, wherein the predicting and classifying the frequency of using the APP in the future comprises:
    predicting a time T in case that the user uses the APP in the foreground again next time according to the user habit of using the APP and the current scenario;
    if $T>T1$, classifying the APP into Class 1 which indicates to be rarely used in the future; or otherwise;
    if $T>T2$, classifying the APP into Class 2 which indicates to be occasionally used in the future; or otherwise;
    if $T>T3$, classifying the APP into Class 3 which indicates to be normally used in the future; or otherwise; and
    classifying the APP into Class 4 which indicates to be frequently used in the future,
    where T1, T2, and T3 are preset time criteria, and $T1>T2>T3>0$.

4. The method of claim 3, wherein the adopting the corresponding restriction measurement to restrict the power consumption of the APP in the background according to the classification result comprises:

for an APP of Class 1, determining a corresponding restriction measurement in the background to be to immediately freeze the APP of Class 1;
for an APP of Class 2, determining a corresponding restriction measurement in the background to be to freeze the APP of Class 2 after a period of time t1;
for an APP of Class 3, determining a corresponding restriction measurement in the background to be to freeze the APP of Class 2 after a period of time t1+t2; and
for an APP of Class 4, determining a corresponding restriction measurement in the background to be not to freeze the APP of Class 4,
where t1 and t2 are preset times.

5. The method of claim 1,
wherein the APP-related operation data comprises: system state change information and APP power consumption information during a runtime of the APP,
wherein the system state change information comprises at least one of a network state change, a Bluetooth state change, a global positioning system (GPS) state change, a location information change, or a CPU/DDR/GPU frequency, and
wherein the APP power consumption information comprises at least one of foreground power consumption, background power consumption, a number of runs in the foreground, a number of runs in the background, a foreground run time, or a background run time.

6. The method of claim 1, wherein the restriction measurement comprises:
at least one of a restricting CPU/DDR/GPU frequency or a restricting memory usage.

7. The method of claim 1,
wherein the APP-related operation data comprises: system state change information and APP power consumption information during a runtime of the APP,
wherein the system state change information comprises at least one of a network state change, a Bluetooth state change, a global positioning system (GPS) state change, a location information change, or a CPU/DDR/GPU frequency, and
wherein the APP power consumption information comprises at least one of foreground power consumption, background power consumption, a number of runs in the foreground, a number of runs in the background, a foreground run time, or a background run time.

8. The method of claim 1,
wherein the APP-related operation data comprises: system state change information and APP power consumption information during a runtime of the APP,
wherein the system state change information comprises at least one of a network state change, a Bluetooth state change, a global positioning system (GPS) state change, a location information change, or a CPU/DDR/GPU frequency, and
wherein the APP power consumption information comprises at least one of foreground power consumption, background power consumption, a number of runs in the foreground, a number of runs in the background, a foreground run time, or a background run time.

9. A device based on artificial intelligence (AI) prediction in a mobile communication system the device comprising:
a data collection module;
a data analysis module; and
a decision execution module,
wherein the data collection module is configured to collect application (APP)-related operation data on a terminal,
wherein the data analysis module is configured to:
carry out AI analysis on the APP-related operation data collected by the data collection module, to predict a timing and a restriction measurement to restrict an APP in a background,
send a corresponding first command to the decision execution module,
determine and record an optimum frequency of a central processing unit (CPU)/double data rate (DDR)/graphics processing unit (GPU) in case that the APP is operating in a foreground, and
send a corresponding second command to the decision execution module, in case that power consumption of the APP in the foreground is abnormal, and
wherein the decision execution module is configured to:
receive the first command sent from the data analysis module,
adopt the restriction measurement to restrict the APP in the background at the timing predicted,
receive the second command notified from the data analysis module, in case that the power consumption of the APP in the foreground is abnormal, and
set a frequency of the CPU/DDR/GPU to the optimum frequency, or prompt a user to upgrade the APP, in case that the power consumption of the APP in the foreground is abnormal.

10. The device of claim 9, wherein the data analysis module is further configured to:
predict and classify a frequency of using the APP in future according to a user habit of using the APP and a current scenario, and adopt a corresponding restriction measurement to restrict power consumption of the APP in the background according to a classification result.

11. The device of claim 10, wherein the data analysis module is further configured to:
predict a time T in case that the user uses the APP in the foreground again next time according to the user habit of using the APP and the current scenario,
if T>T1, classify the APP into Class 1 which indicates to be rarely used in the future; or otherwise,
if T>T2, classify the APP into Class 2 which indicates to be occasionally used in the future; or otherwise,
if T>T3, classify the APP into Class 3 which indicates to be normally used in the future; or otherwise, and
classify the APP into Class 4 which indicates to be frequently used in the future,
where T1, T2, and T3 are preset time criteria, and T1>T2>T3>0.

12. The device of claim 11, wherein the data analysis module is further configured to:
for an APP of Class 1, determine a corresponding restriction measurement in the background to be to immediately freeze the APP of Class 1,
for an APP of Class 2, determine a corresponding restriction measurement in the background to be to freeze the APP of Class 2 after a period of time t1,
for an APP of Class 3, determine a corresponding restriction measurement in the background to be to freeze the APP of Class 2 after a period of time t1+t2, and
for an APP of Class 4, determine a corresponding restriction measurement in the background to be not to freeze the APP of Class 4,
where t1 and t2 are preset times.

13. The device of claim 9,
wherein the APP-related operation data comprises: system state change information and APP power consumption information during a runtime of the APP,
wherein the system state change information comprises at least one of a network state change, a Bluetooth state change, a global positioning system (GPS) state change, a location information change, or a CPU/DDR/GPU frequency, and
wherein the APP power consumption information comprises at least one of foreground power consumption, background power consumption, a number of runs in the foreground, a number of runs in the background, a foreground run time, or a background run time.

14. The device of claim 9, wherein the restriction measurement comprises:
at least one of a restricting CPU/DDR/GPU frequency or a restricting memory usage.

15. The device of claim 9, wherein the data analysis module is further configured to:
predict and classify a frequency of using the APP in future according to a user habit of using the APP and a current scenario, and
adopt a corresponding restriction measurement to restrict power consumption of the APP in the background according to a classification result.

16. The device of claim 9,
wherein the APP-related operation data comprises system state change information and APP power consumption information during a runtime of the APP,
wherein the system state change information comprises at least one of a network state change, a Bluetooth state change, a global positioning system (GPS) state change, a location information change, or a CPU/DDR/GPU frequency, and
wherein the APP power consumption information comprises at least one of foreground power consumption, background power consumption, a number of runs in the foreground, a number of runs in the background, a foreground run time, or a background run time.

\* \* \* \* \*